(12) United States Patent
Sheau Tung Wong et al.

(10) Patent No.: US 7,708,474 B2
(45) Date of Patent: May 4, 2010

(54) OPTICAL TRANSCEIVER MODULE AND DUPLEX FIBER OPTIC CONNECTOR

(75) Inventors: Tom Sheau Tung Wong, Singapore (SG); Adrianus J. P. van Haasteren, Singapore (SG); Tze Wei Lim, Singapore (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/353,589

(22) Filed: Jan. 14, 2009

(65) Prior Publication Data

US 2009/0220198 A1  Sep. 3, 2009

Related U.S. Application Data

(62) Division of application No. 12/040,986, filed on Mar. 3, 2008.

(51) Int. Cl.
*G02B 6/36* (2006.01)
*H04B 10/00* (2006.01)

(52) U.S. Cl. .............................. 385/92; 385/53; 385/55; 385/59; 385/60; 385/89; 398/134; 398/135; 398/136; 398/137; 398/138; 398/139

(58) Field of Classification Search .................... 385/55, 385/92, 86, 14, 53, 59–60; 398/134–139
See application file for complete search history.

(56) References Cited

U.S. PATENT DOCUMENTS

| 4,645,295 | A | * | 2/1987 | Pronovost | 385/55 |
|---|---|---|---|---|---|
| 4,784,456 | A | * | 11/1988 | Smith | 385/55 |
| 4,787,706 | A | * | 11/1988 | Cannon et al. | 385/59 |
| 4,871,227 | A | * | 10/1989 | Tilse | 385/55 |
| 5,579,425 | A | | 11/1996 | Lampert et al. | |
| 5,731,546 | A | | 3/1998 | Miles et al. | |
| 6,048,106 | A | * | 4/2000 | Iwase | 385/88 |
| 6,250,817 | B1 | | 6/2001 | Lampert et al. | |
| 6,325,549 | B1 | * | 12/2001 | Shevchuk | 385/86 |
| 6,485,192 | B1 | | 11/2002 | Plotts et al. | |
| 6,551,117 | B2 | * | 4/2003 | Poplawski et al. | 439/92 |
| 6,824,416 | B2 | | 11/2004 | Di Mascio | |
| 7,077,686 | B2 | | 7/2006 | Seo et al. | |
| 7,350,984 | B1 | | 4/2008 | Togami et al. | |
| 7,421,181 | B2 | | 9/2008 | Kanou et al. | |
| 2008/0037938 | A1 | * | 2/2008 | Kiani et al. | 385/78 |

* cited by examiner

*Primary Examiner*—Brian M. Healy
*Assistant Examiner*—Guy G Anderson

(57) ABSTRACT

Various embodiments of duplex fiber optic connectors and optical transceiver modules are provided. One embodiment comprises an optical transceiver module comprising: an integrally-formed housing having a duplex front port with a pair of alignment holes for receiving a pair of ferrules from a duplex fiber optic connector, the duplex front port having an upper flexible retaining element and a lower flexible retaining element for retaining the pair of ferrules from the duplex fiber optic connector; an opto-electronic assembly contained within the housing; and an electrical interface extending from the integrally-formed housing.

8 Claims, 9 Drawing Sheets

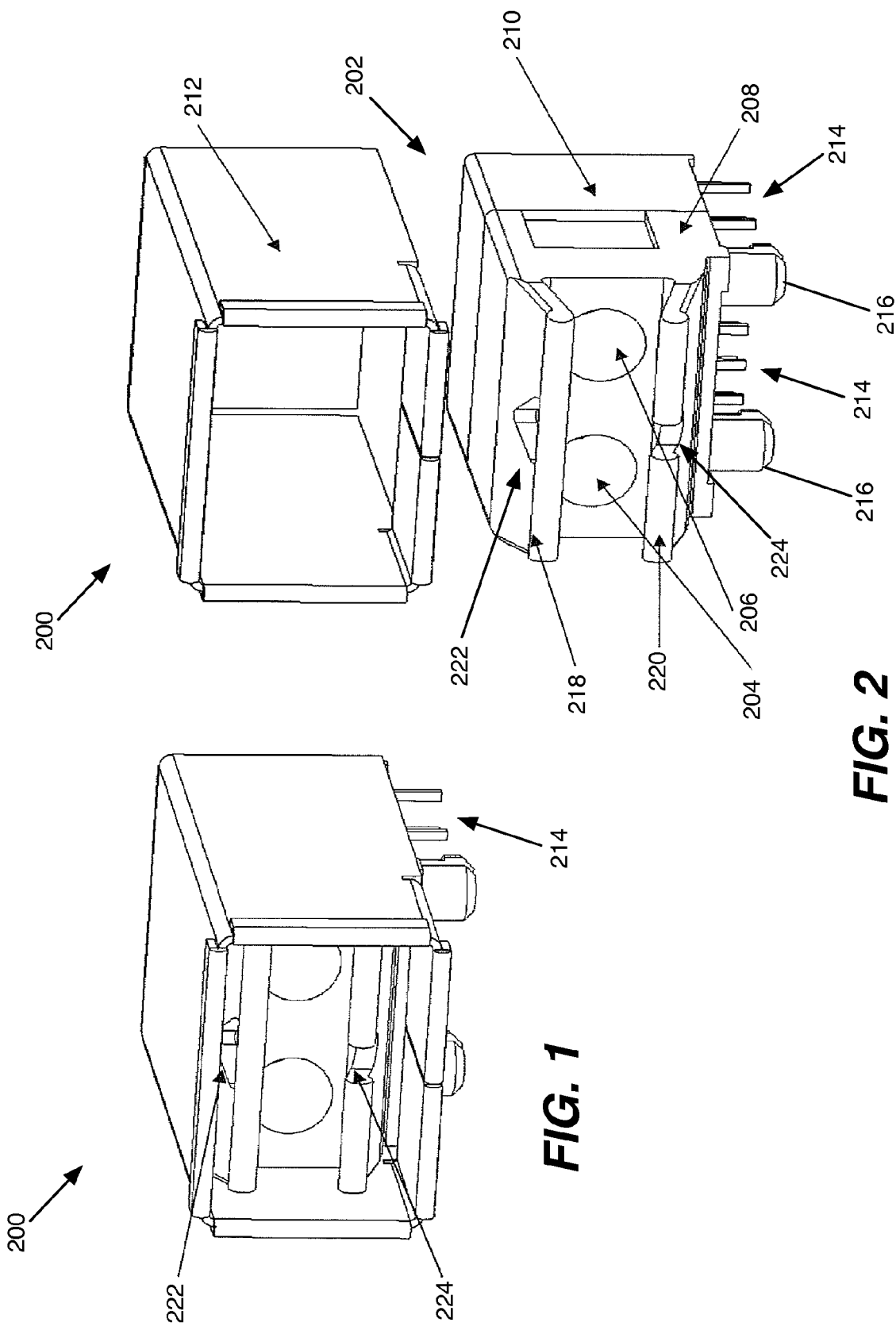

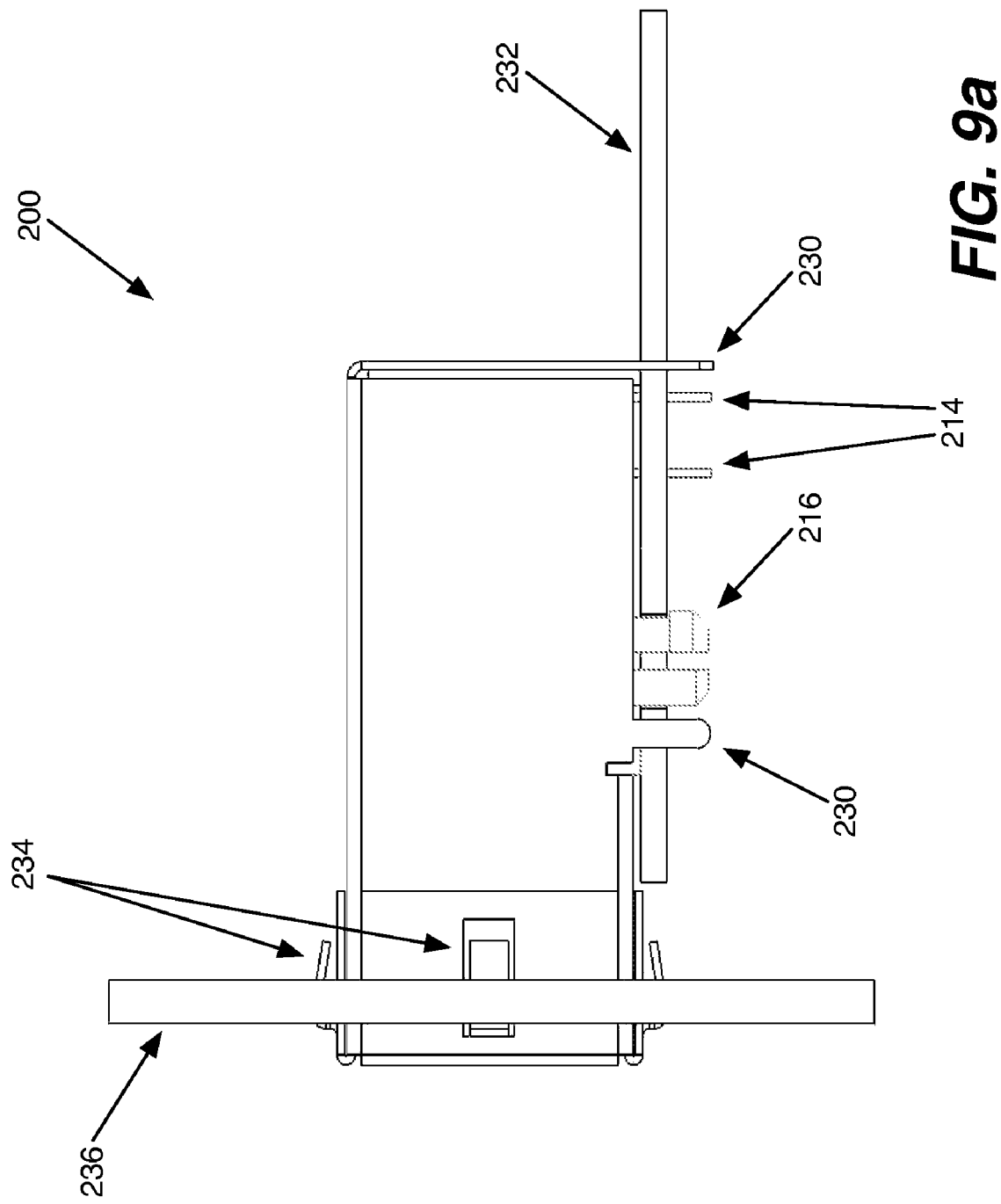

OPTICAL TRANSCEIVER MODULE AND DUPLEX FIBER OPTIC CONNECTOR

This application is a divisional application of, and claims the benefit of the priority of, copending U.S. patent application Ser. No. 12/040,986, entitled "Optical Transceiver Module and Duplex Fiber Optic Connector," filed on Mar. 3, 2008, which is hereby incorporated by reference in its entirety.

BACKGROUND

In the area of wire communications, there are electrical and optical communication links between equipment. An electrical link commonly comprises an electrical transmitter and an electrical receiver that are connected by metal wire. The electrical transmitter converts information to an electrical signal and then transmits it over the metal wire which acts as a transmission medium. The electrical receiver converts the received electrical signal back to useful information. An optical link generally comprises an optical transmitter and an optical receiver component that are connected by a fiber optic cable. The optical transmitter typically comprises a light source, such as, for example, a light-emitting diode (LED), which converts an electrical data signal into a modulated light signal. This light signal is transmitted through fiber optic cable and is received by the optical receiver, which generally comprises a light detector, such as, for example, a photosensor, photodiode, etc. The optical receiver converts the light signal back into an electrical data signal.

The housing of an optical transmitter or receiver includes appropriate electrical pins which provide an electrical input/output (I/O) data interface with the communications equipment. The front face of the housing (which comprises a plastic or similar material) includes an alignment port for receiving a fiber optic connector to which a fiber optic cable is terminated. The optical transmitter and receiver are connected by an optical fiber.

To secure the fiber optic connector within the alignment port, the housing may also include features for retaining the connector in the alignment port. A typical industrial connector such as Versatile Link includes a horizontal C-shaped feature defined by opposing elements that protrude from the front face at the alignment port.

The use of fiber optics provides a number of advantages over metal wires. Fiber optic cable allows the transport of data signals over longer distances. Fiber cables are lighter than metal wires because they are made of clear glass, polymer, or similar materials. The fiber optic cable is non-conductive and, therefore, protects against electrical shorts and lightning strikes. Optical signals are not degraded by electromagnetic interference (EMI) and, therefore, may provide better signal integrity than metal wires. Optical fiber also provides better data security protection because it is much more difficult to tap signals along a fiber.

In fiber optic applications, the polymer optical fiber (POF) cable is more cost effective than glass optical fiber cable. It also provides easy field termination and is less sensitive to dust contamination due to large fiber core diameter.

SUMMARY

Various embodiments of optical transceiver modules and duplex fiber optic connectors are provided. One embodiment comprises an optical transceiver module. One such module comprises: an integrally-formed housing having a duplex front port with a pair of alignment holes for receiving a pair of ferrules from a duplex fiber optic connector, the duplex front port having an upper flexible retaining element and a lower flexible retaining element for retaining the pair of ferrules from the duplex fiber optic connector; an opto-electronic assembly contained within the housing; and an electrical interface extending from the integrally-formed housing.

Another embodiment comprises a duplex fiber optic connector. One such connector comprises: an integrally-formed housing having a top portion and a bottom portion connected via a flexible hinge and defining a pair of channels for receiving a transmitter fiber optic cable and a receiver fiber optic cable at a first end of the integrally-formed housing; a pair of ferrules disposed on a second end of the integrally-formed housing opposite the first end, one ferrule for receiving a first fiber core associated with the transmitter fiber optic cable and the other ferrule for receiving a second fiber core associated with the receiver fiber optic cable; a connector latching element disposed on one of the top portion and the bottom portion; and a connector orientation key or keyway disposed on the other of the top portion and the bottom portion.

BRIEF DESCRIPTION OF THE DRAWINGS

FIG. 1 is a perspective diagram of one embodiment of an optical transceiver module adapted to receive the duplex fiber optic connector of FIGS. 3-5.

FIG. 2 is a partially exploded view of the optical transceiver module of FIG. 1.

FIG. 9a is a side view of an alternative embodiment of an optical transceiver module adapted to receive the duplex fiber optic connector of FIGS. 3-5.

FIG. 9b is a front view of the optical transceiver module of FIG. 9a.

DETAILED DESCRIPTION

Figure 3:
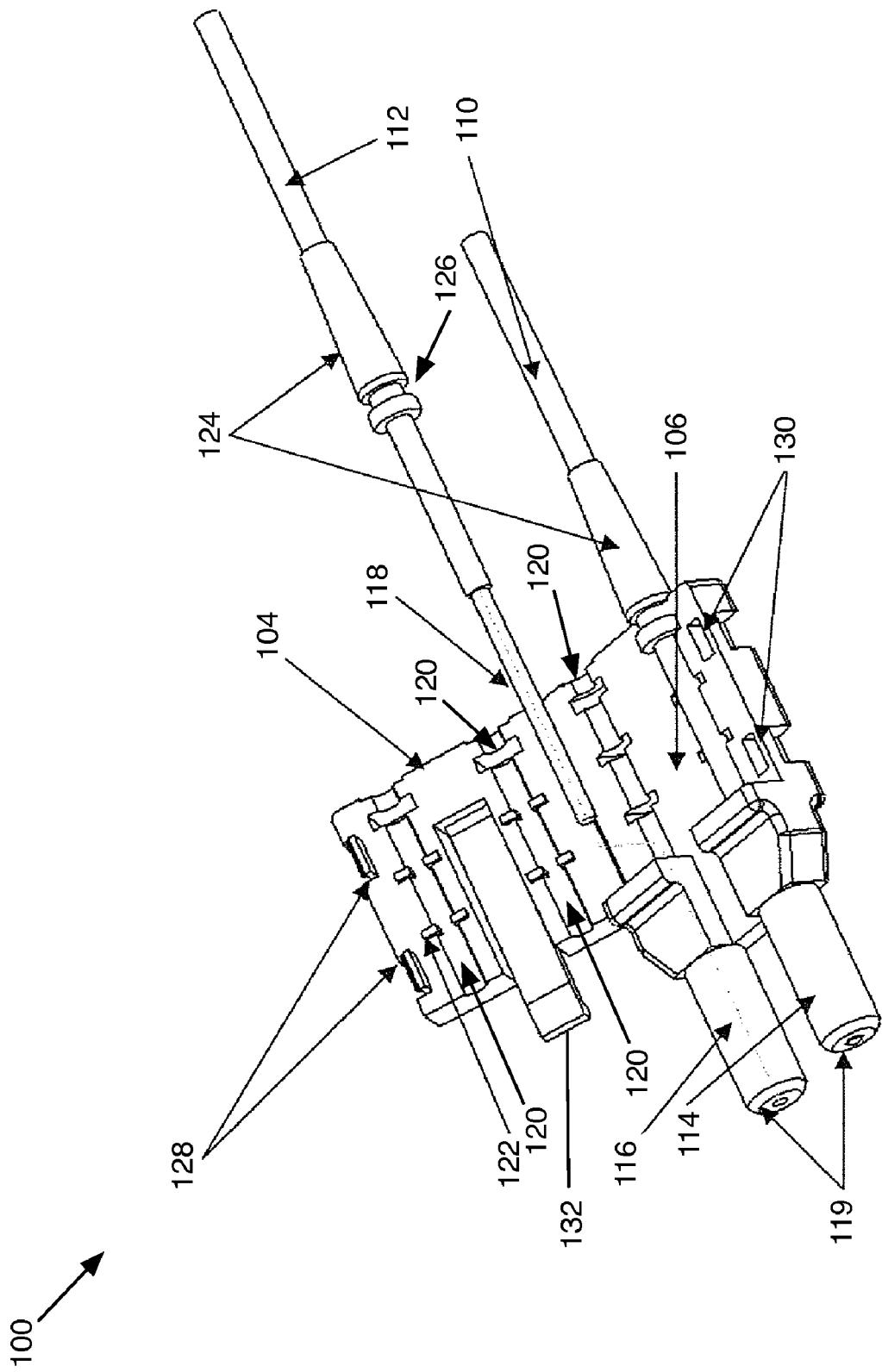
FIG. 3 is perspective diagram of one embodiment of a duplex fiber optic connector adapted to be received by the optical transceiver module of FIGS. 1 & 2.

Various embodiments of a duplex fiber optic connector 100 and an associated optical transceiver module 200 are described. The optical communication module 200 and the corresponding duplex fiber optic connector 100 accommodate a transmitter and receiver component to form an optical transceiver module. As described below in more detail, in one embodiment, the optical transceiver module 200 comprises two generally C-shaped vertical protrusions that are adapted to hold the duplex fiber optic connector 100. This configuration reduces the physical footprint of existing modules to untwisted pair (UTP) module size and also shares the same layout for the electrical I/O pins. Therefore, the optical transceiver module 200 may be conveniently substituted for an electrical transceiver in, for example, high density electrical network hubs, routers, and switches. This general configuration for the optical transceiver module may also enable backwards compatibility with existing Simplex Versatile Link (VL) connectors that are commonly used in, for example, industrial fiber optic links. Furthermore, the duplex fiber optic connector 100 and the optical transceiver module 200 support an improved connector latching feature that improves the retention force robustness, is less prone to breakage as compared to existing modules and connectors, such as the current range of VL connectors, and also offers a connector orientation feature for ease of insertion.

FIGS. 1 & 2 illustrate an embodiment of the optical transceiver module 200 which is configured to receive the duplex fiber optic connector 100. The optical transceiver module 200 is further configured to support a connector latching feature and a connector orientation feature, as described below in more detail. Referring to FIGS. 1 and 2, the optical transceiver module 200 comprises a housing 202 having a duplex front port 208 and an electro-optical assembly 210. The electro-optical assembly 210 includes an optical transmitter and an optical receiver. As known in the art, the optical transmitter generally comprises the components for generating an optical signal (e.g., a light source, such as a light-emitting diode (LED), and focus elements), and the optical receiver generally comprises the components for receiving an optical signal (e.g., a photodetector or photosensor). The optical transceiver module 200 has electrical pins 214 to provide the electrical interface to a communication management system, such as, for example, a network hub, a router, a switch, or any other data communication device or equipment. To provide support when installed into the communication equipment, the optical transceiver module 200 may include support pedestals 216.

The housing 202 may comprise any suitable material. In one embodiment, the housing 202 may be integrally formed from a plastic or similar material using, for example, injection molding or other manufacturing techniques. In other embodiments, the housing 202 may comprise separate components made of other materials, which are joined together to form the optical transceiver module 200, as illustrated in FIG. 2. The housing 202 may be protected by a metal shell 212 that fits over the housing 202, while providing functional access to the duplex front port 208 and pins 214.

Figure 9B:
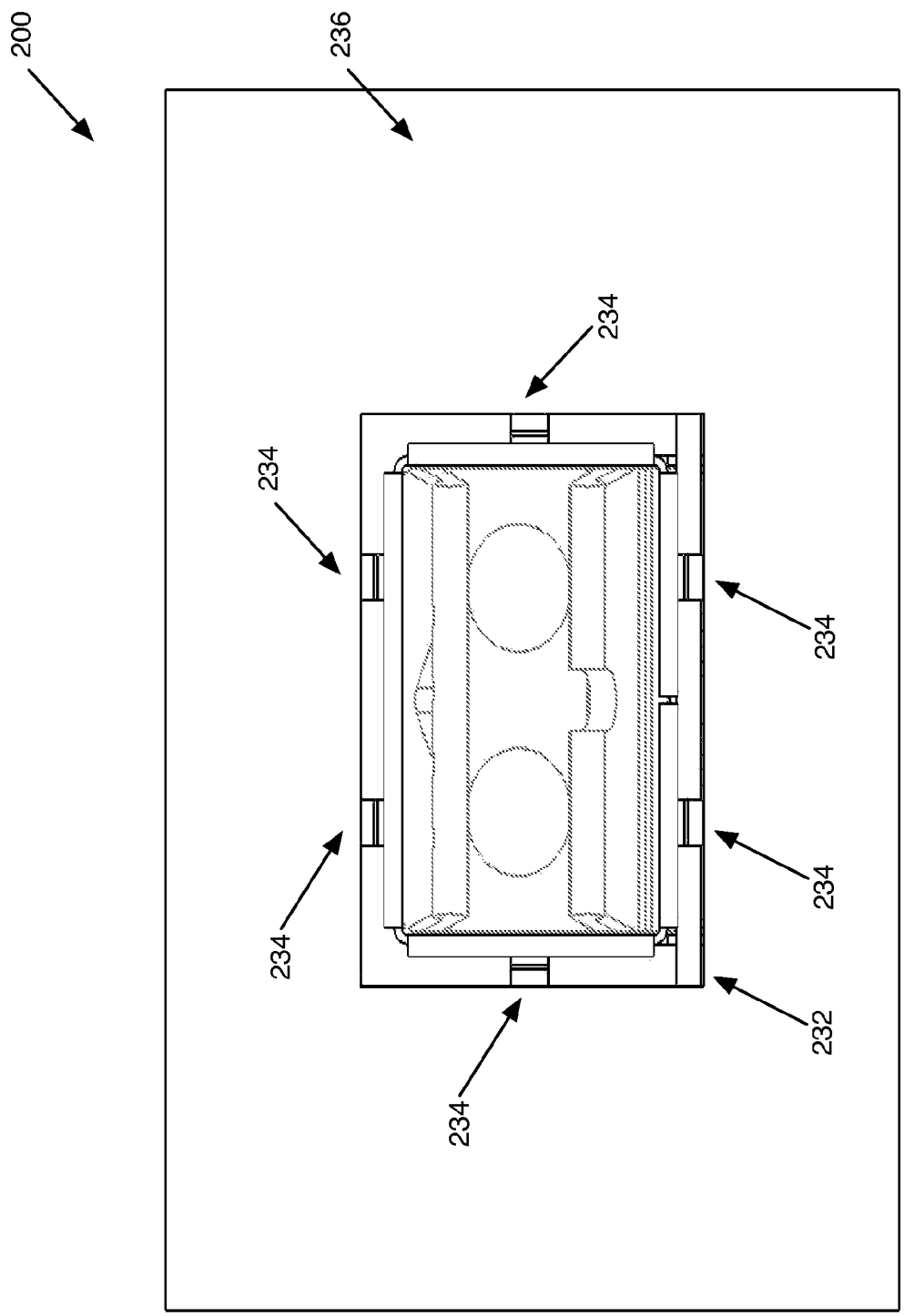
Figure 9C:
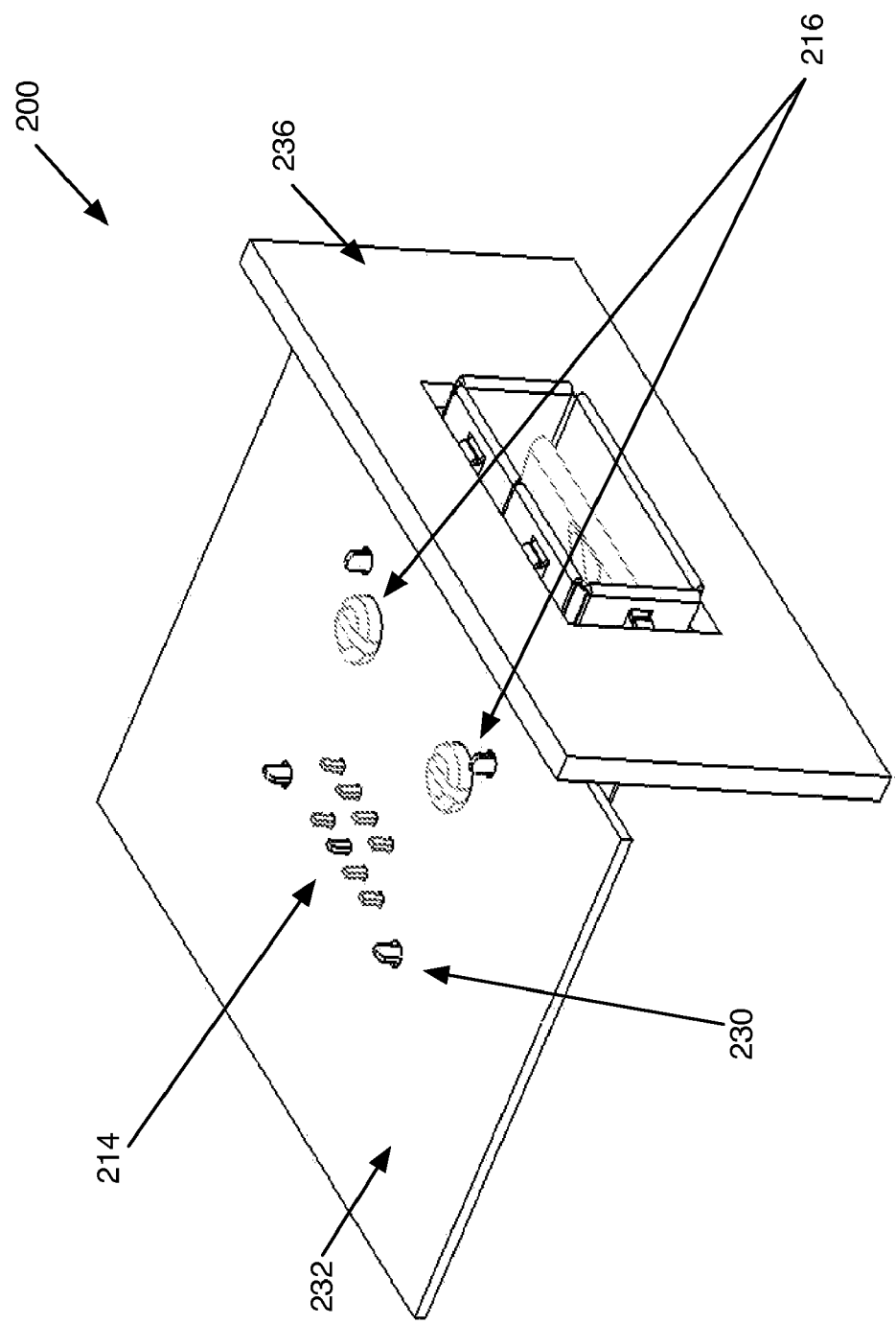
FIG. 9c is a perspective bottom view of the optical transceiver module of FIG. 9c, illustrating optical transceiver mounted within communication equipment with electrical I/O interface layout and mounting holes.

FIGS. 9A-9C illustrate another embodiment of the optical transceiver module 200. In this embodiment, the metal shell 212 with more than one protrusion serves as grounding connectors 230 for the housing 202, which is connected to equipment, such as, a printed circuit board (PCB) ground plane 232 to reduce EMI emission. Flexible metal fingers 234 may be located, for example, on the front side of the metal shell 212. The flexible metal fingers 234 make contact with communication equipment metal housing 236 to further improve electromagnetic interface shielding.

The duplex front port 208 comprises a pair of ferrule alignment holes 204 and 206. Alignment hole 204 is associated with the optical transmitter and the alignment hole 206 is associated with the optical receiver. The duplex front port 208 is adapted to receive and retain the duplex fiber optic connector 100. The duplex front port 208 includes a pair of flexible retaining elements for retaining the duplex fiber optic connector 100. In the embodiment illustrated in FIGS. 1 and 2, an upper flexible retaining element 218 and a lower flexible retaining element 220 extend outward from the duplex front port 208. The flexible retaining elements 218 and 220 may be slightly angled toward the ferrule alignment holes 204 and 206. In this manner, the flexible retaining elements may clamp down on the duplex fiber optic connector 100 when the ferrules 114 and 116 are inserted into the alignment holes 204 and 206, as described below. The slot 222 and cut-out 224 allow the left and right side of the flexible retaining elements 218 and 220 to deflect independently. It should be appreciated that, in certain embodiments, this feature may enable flexible retaining elements 218 and 220 to clamp down, for example, two simplex Versatile Link connectors with varying ferrule diameters.

As illustrated in FIG. 9c, in certain embodiments, the optical transceiver module 200 may be configured with the same electrical I/O interface layout as a conventional unshielded twisted pair (UTP) electrical transceiver module, with two flexible snap-fit pedestals 216. The snap-fit pedestals 216 may serve two general functions: (1) to support the module and (2) to prevent module dislodges from the equipment PCB before soldering. It should be further appreciated that the the duplex fiber optic connector 100 may be configured with the same connector physical size as a conventional UTP connector. The reduced external footprint may offer a space savings advantage for fiber communication solutions in, for example, consumer and industrial applications where the spacing between transceiver modules becomes critical (e.g., in network hubs, routers and switches). Furthermore, this may allow the optical transceiver module 200 to be easily incorporated into existing UTP designs.

The duplex fiber optic connector 100 comprises a connector housing 102 having a top portion 104 and a bottom portion 106. The top portion 104 and the bottom portion 106 may be joined at adjacent edges by a flexible hinge 108, which enables the connector housing 102 to be opened (FIG. 3) and closed (FIGS. 4 & 5) and, thereby, provide access to the interior of the connector housing 102 for installing a pair of fiber optic cables (i.e., a transmitter fiber optic cable 110 and a receiver fiber optic cable 112). In one embodiment, to provide a low cost connector, the connector housing 102 may be integrally formed from a plastic or similar material using, for example, injection molding or other manufacturing techniques. In other embodiments, the connector housing 102 may comprise separate components made of other materials, which are joined together to form the connector housing 102.

One end of the connector housing 102 supports ferrules 114 and 116, and the opposing end receives the transmitter fiber optic cable 110 and the receiver fiber optic cable 112. Ferrule 114 receives a fiber core 118 associated with the transmitter fiber optic cable 110, and the ferrule 116 receives a fiber core 118 associated with the receiver fiber optic cable 112. Ferrules 114 and 116 provide the structure for precisely aligning the corresponding fiber cores 118 with a transmitter port and a receiver port disposed on a front face of the optical transceiver module 200. In this manner, optical signals may be carried along transmitter fiber optic cable 110 and ferrule 114, and optical signals may be carried along receiver fiber optic cable 112 and ferrule 116. The installation of the duplex fiber optic connector 100 into the optical transceiver module 200 is described in more detail below.

FIG. 3 shows a partially exploded view of the duplex fiber optic connector 100 with the connector housing 102 open to expose the interior of the duplex fiber optic connector 100. In the embodiment illustrated in FIG. 3, a pair of channels 120 is formed on both the top portion 104 and the bottom portion 106 of the connector housing 102 for receiving fiber cores 118. The pairs of channels 120 are aligned such that the transmitter fiber optic cable 110 and the receiver fiber optic cable 112 are securely positioned within the channels 120 and the fiber cores are precisely aligned with the ferrules 114 and 116. Cable alignment/restraining elements 122 may be positioned along the channels 120 to guide and hold the fiber optic cables 110 and 112 during installation, or further support or align the fiber core 118 or the fiber optic cables 110 and 112.

Figure 7:
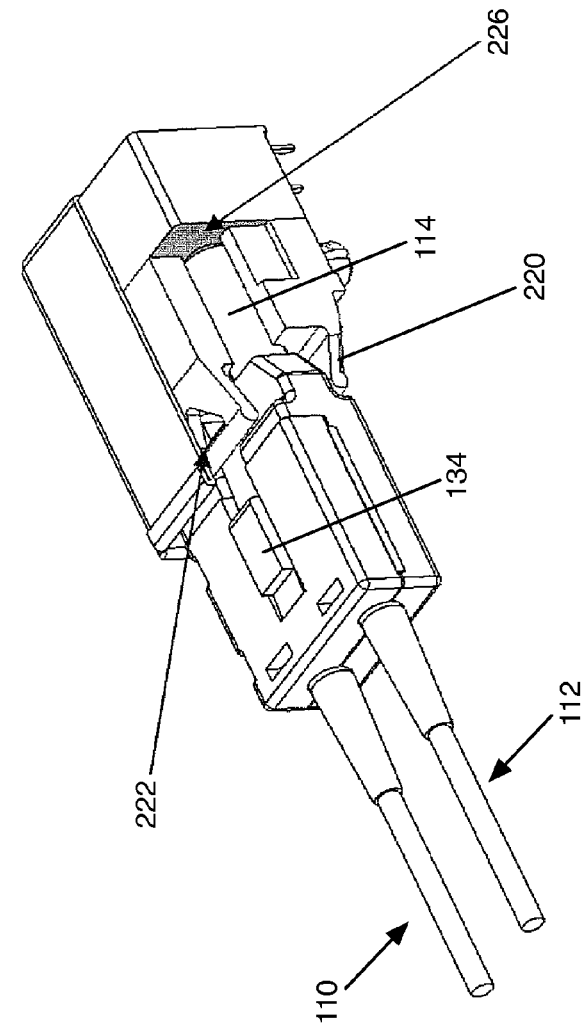
FIG. 7 illustrates the engagement of the duplex fiber optic connector and the optical transceiver module.
Figure 8:
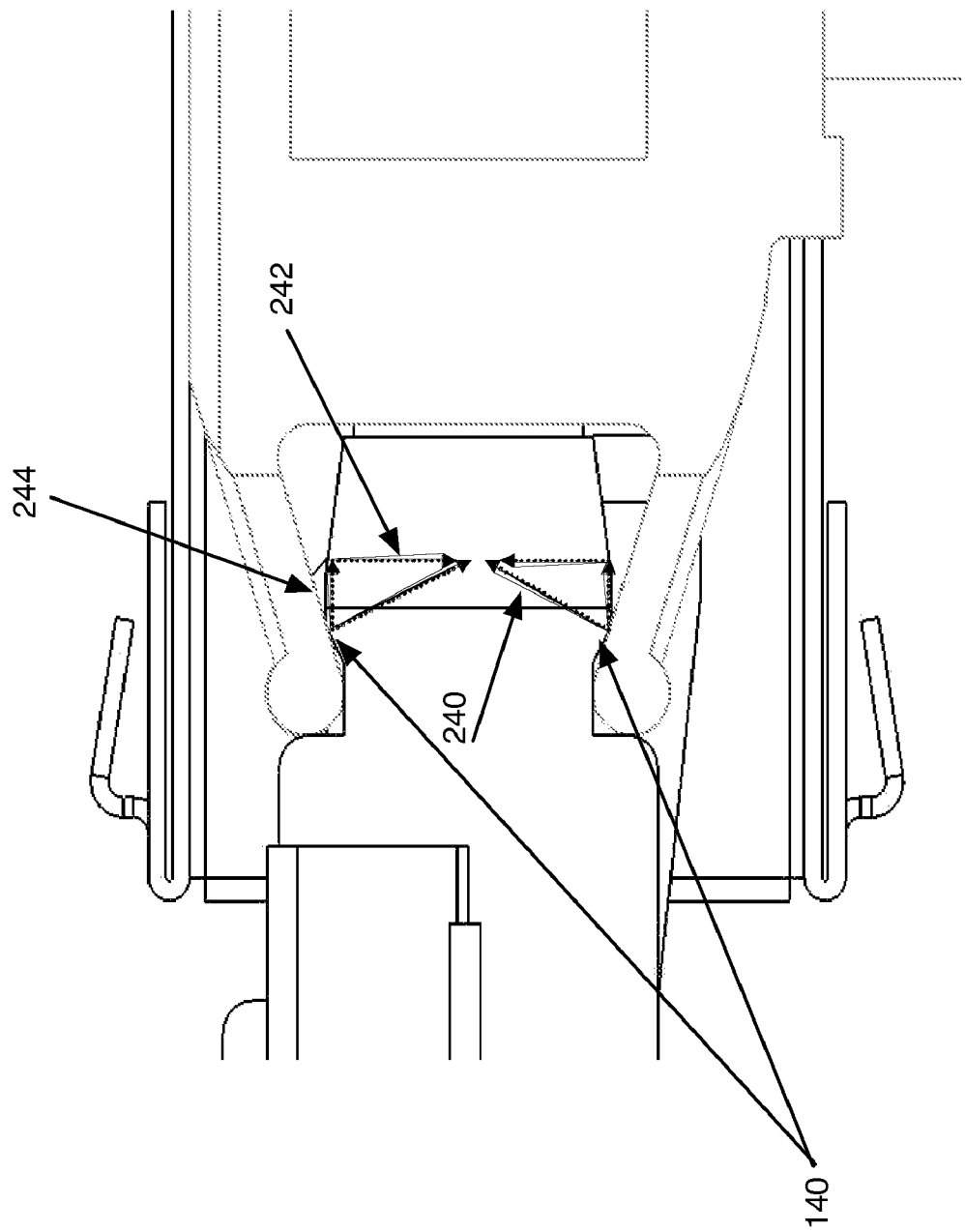
FIG. 8 is a side view that illustrates the engagement of the duplex fiber optic connector and the optical transceiver module.

As further illustrated in FIG. 3, the fiber optic cables 110 and 112 enter the connector housing 102 at the end opposite ferrules 114 and 116. Cables 110 and 112 comprise a predefined length of fiber core 118. The length of core exposed may be based on the physical dimensions of the interior of the duplex fiber optic connector 100. For example, the length of fiber core 118 may be based on the length of core to be received in ferrules 114 and 116. During installation, the fiber core 118 may be exposed by stripping off the fiber cable jacket with, for example, a fiber stripping tool. In one embodiment, the fiber optic cables 110 and 112 may comprise a plastic or acrylic optical fiber with, for example, a general-purpose resin as the core material and a polymer material for the cladding material. It should be appreciated, however, that alternative materials may be used for the core, cladding, or other components. Slight protrusions which are sloping forward and backward away from the protrusion can be found behind ferrule 114, 116 and which act as connector retention features 140 (FIG. 8). The flexible retaining elements 218, 220 will hold the retention features 140 in place with resultant force 240 once the connector is fully inserted into the transceiver module. The resultant force 240 is translated into vertical force component 242 and horizontal force component 244 which are acting on the connector. The horizontal force component 244 pushes the connector which in turn preloads ferrule 114, 116 end faces to mate with transceiver optical reference 226 as demonstrated on FIG. 7.

The fiber optic cables 110 and 112 may include a strain relief boot 124. The strain relief boots 124 may cover the fiber optic cable at or near the point at which the cable enters the connector housing 102. The strain relief boots 124 may be formed on the fiber optic cable or, alternatively, may be inserted over the fiber cables 110 and 112 during installation. To assist in the installation process and support the retention of the fiber optic cables 110 and 112 within the connector housing 102, the strain relief boots 124 may incorporate a ring 126 which engages with a corresponding recess in the top portion 104 or the bottom portion 106 of the housing (FIG. 3). During installation, the strain relief boots 124 may be placed onto the bottom portion 106 of the connector housing 102 with the ring 126 resting in the recess and the fiber cores 118 inserted into the corresponding ferrules. The fiber core 118 extends along the length of the corresponding ferrule and ends at or near a ferrule front face 119. The cable alignment/restraining elements 122 restrain the fiber optic cables in place when the top portion 104 and the bottom portion 106 are closed onto each other.

With the fiber optic cables 110 and 112 in place within the connector housing 102, the top portion 104 and the bottom portion 106 may be clamped together via a latching mechanism. As illustrated in FIG. 3, one or more flexible latching elements 128 may be placed on the underside of the top portion 104. One or more corresponding latch holding features 130 may be placed on the bottom portion 106. The flexible latching elements 128 and the latch holding features 130 may be formed integrally with the connector housing 102 or otherwise attached to the connector housing 102. The flexible latching elements 128 are positioned to latch onto the latch holding features 130 when the top portion 104 is closed onto the bottom portion 106. The flexible latching elements 128 may be depressed to release the latching mechanism and enable the connector housing 102 to be opened.

The duplex fiber optic connector 100 may include a latching feature for releasable latching the connector to the optical transceiver module 200, and an orientation feature for properly orienting the connector relative to the optical transceiver module 200. The orientation feature ensures that the duplex fiber optic connector 100 is inserted into the optical transceiver module 200 with the transmitter and receiver cables 110 and 112 linked to the appropriate transmitter and receiver ports. The latching feature provides a convenient mechanism for releasable securing the duplex fiber optic connector 100 to the optical transceiver module.

Figure 4:
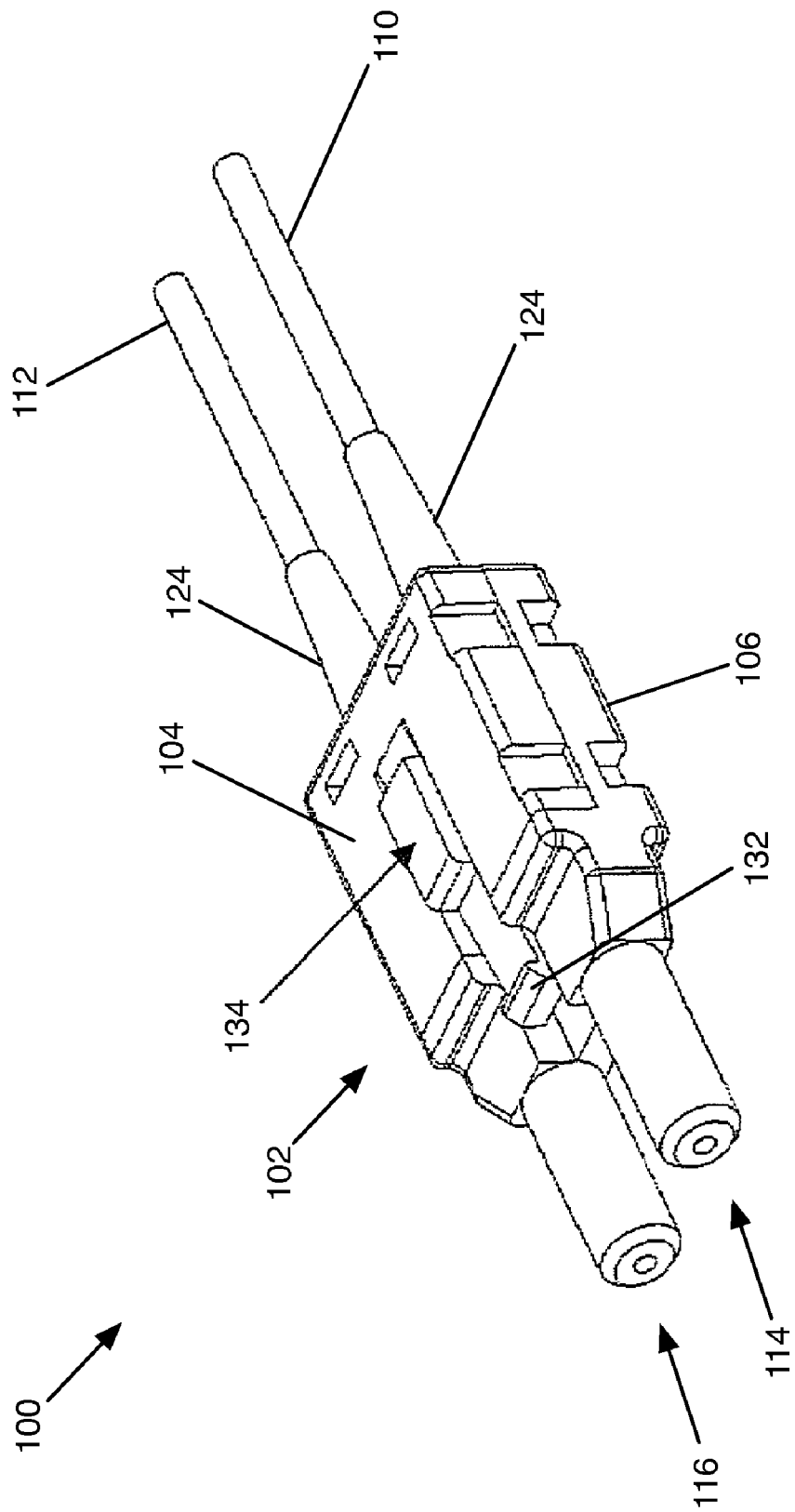
FIG. 4 illustrates the duplex fiber optic connector of FIG. 3 with the housing closed.
Figure 5:
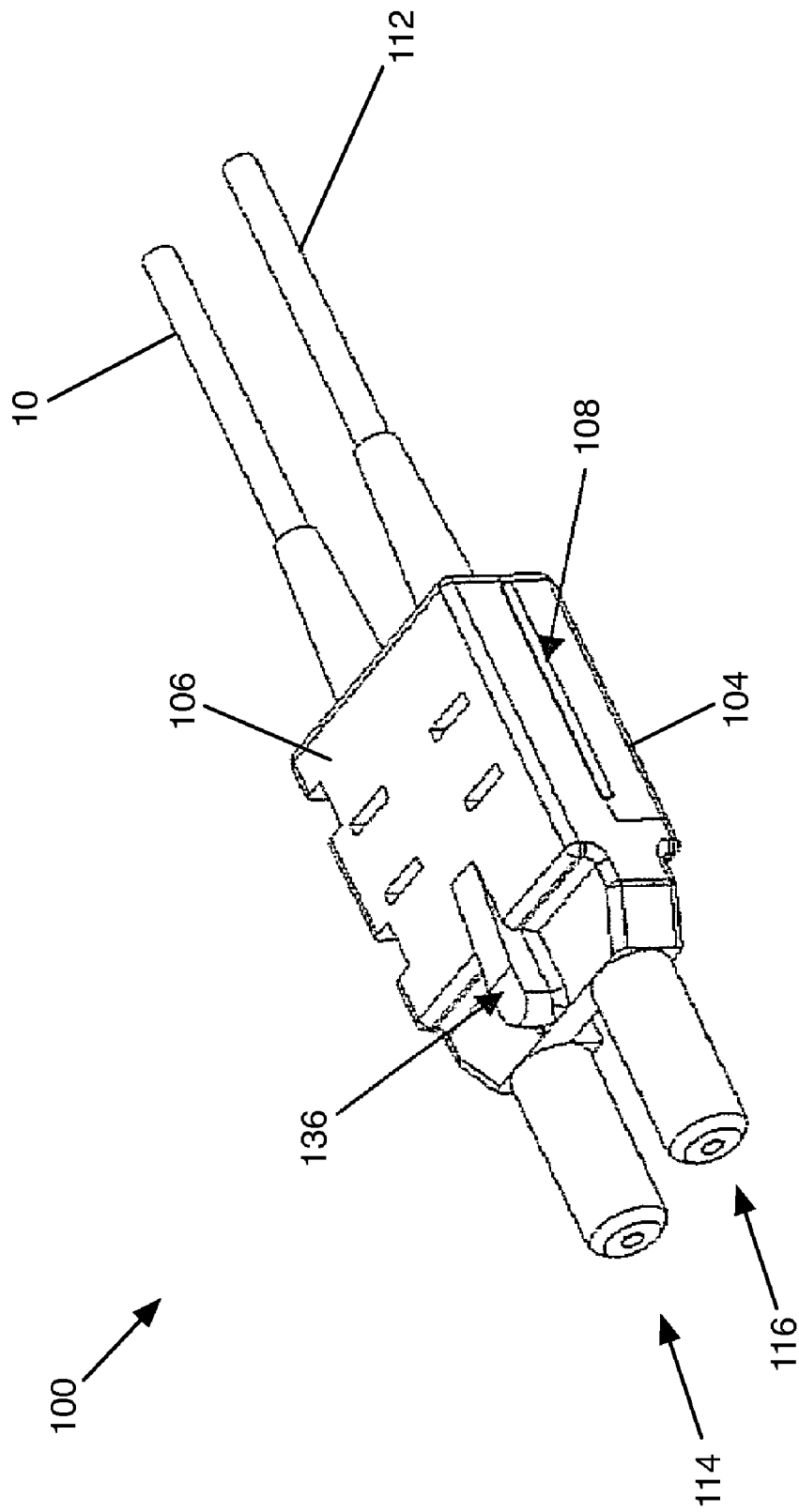
FIG. 5 is a bottom view of the duplex fiber optic connector of FIGS. 3 & 4.
Figure 6:
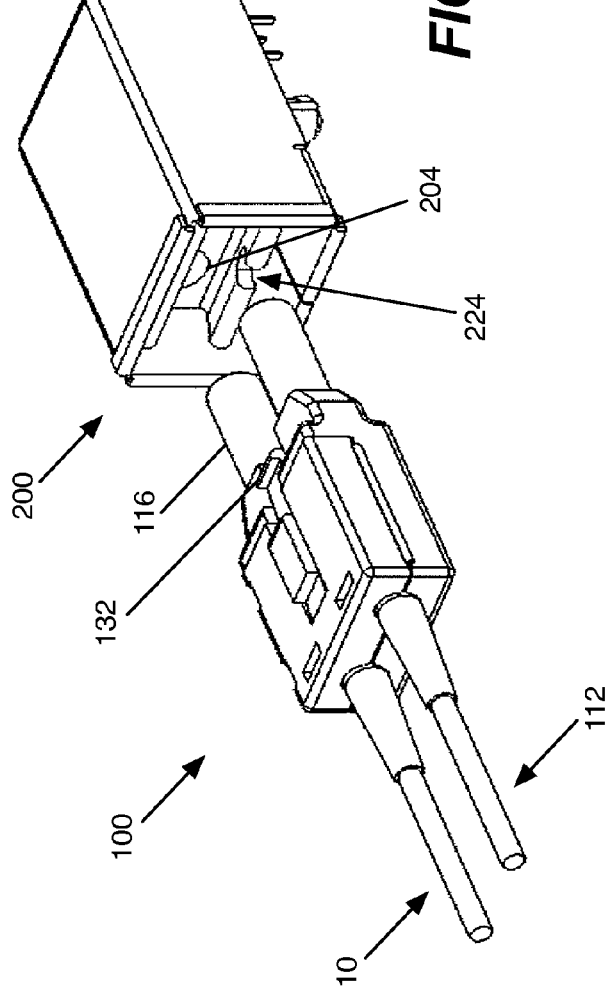
FIG. 6 illustrates the installation of the duplex fiber optic connector into the optical transceiver module.

Having described the general components of the duplex fiber optic connector 100 and the optical transceiver module 200, the orientation and latching features mentioned above will now be described in more details. To enable the latching feature, in one embodiment as illustrated in FIG. 4, a latch element 132 is positioned on the top portion 104 of the duplex fiber optic connector 100. The latch element is designed to be lower than top potion 104 of connector housing and strategically placed in between ferrules 114, 116 which provides three-way protections against damage from external element. The latch element comprises a flexible base element having a latch 132. The flexible base element may be configured to vertically flex relative to the connector housing 102 such that the latch 132 is depressed as the duplex fiber optic connector 100 is inserted into the optical transceiver module 200. The latch 132 may include an angled front surface which engages the upper flexible retaining element 218 as the duplex fiber optic connector is inserted.

As illustrated in FIGS. 1 & 2, the upper flexible retaining element 218 on the optical transceiver module 200 may include a suitably-shaped cut-out 222 to receive the latch 132. FIG. 7 shows the proper engagement of the latch 132 and the cut-out 222 to retain the duplex fiber optic connector 100 in the optical transceiver module 200. It should be appreciated that the latch 132 and the cut-out 222 may be shaped in various ways to implement the latching function. In one embodiment, the cut-out 222 is a triangular-shaped cut-out, although key and keyway arrangements may be employed. It should be further appreciated that the location of the latching element and the cut-out 222 may be varied. Furthermore, in alternative embodiments, the latch element may further comprise a release tab 134 disposed on the flexible base element that extends above the upper surface of the connector housing 102 for releasing the latch 132 from the cut-out 222.

The orientation feature is provided, in one embodiment, via an orientation key 136 which locates on the connector housing 102. In the embodiment illustrated in FIG. 2, the orientation key 136 is disposed on the bottom surface of the bottom portion 106 of the connector housing 102. As illustrated in FIG. 2, the bottom flexible retaining element 220 of the optical transceiver module 200 may include a slot 224 for engaging with the orientation key 136. In this manner, the optical transceiver module 200 will only receive the duplex fiber optic connector 100 when the orientation key 136 is properly oriented with the slot 224. This will prevent the duplex fiber optic connector from being improperly inserted with the ferrules 114 and 116 reversed relative to the alignment holes 204 and 206. It should be appreciated that the orientation key 136 and the slot 224 may be shaped in various ways to accommodate a key-to-keyway engagement. It should be further appreciated that the number and location of these elements may be varied. Furthermore, in alternative embodiments, the orientation key 136 may be positioned on the optical transceiver module 200 and the slot 224 may be placed on the duplex fiber optic connector 100.

FIG. 7 generally illustrates the manner in which the duplex fiber optic connector 100 may be inserted into the optical transceiver module 200. The ferrules 116 and 114 may slide along the alignment holes 204 and 206, respectively, and stop when the front face 119 comes in contact with an optical reference element (e.g., surface 226). As the ferrules 114 and 116 are received in the alignment holes 204 and 206, the latch 132 engages the cut-out 222 and the orientation key 136 engages the slot 224.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. An optical connector assembly comprising:
   a duplex fiber optic connector comprising an integrally-formed connector housing comprising:
      a top portion and a bottom portion connected via a flexible hinge and defining a pair of channels for receiving a transmitter fiber optic cable and a receiver fiber optic cable at a first end of the integrally-formed connector housing; and
      a pair of ferrules disposed on a second end of the integrally-formed connector housing opposite the first end, one ferrule for receiving a first fiber core associated with the transmitter fiber optic cable and the other ferrule for receiving a second fiber core associated with the receiver fiber optic cable; and
   an optical transceiver module comprising:
   an integrally-formed transceiver housing having opposing top and bottom surfaces and a front surface perpendicular to the top and bottom surfaces, the front surface having a duplex front port with a pair of alignment holes for receiving the pair of ferrules from the duplex fiber optic connector in a direction parallel to the top and bottom surfaces, the duplex front port having an upper flexible retaining element positioned on the front surface adjacent the top surface and a lower flexible retaining element positioned on the front surface adjacent the bottom surface, the upper and lower flexible retaining elements adapted to vertically flex relative to the top and bottom surfaces and thereby retain the pair of ferrules;
   an opto-electronic assembly contained within the transceiver housing; and
   an electrical interface positioned on and extending away from the bottom surface of the transceiver housing.

2. The optical connector assembly of claim 1, wherein the transceiver housing and the connector housing comprise injection-molded plastic.

3. The optical connector assembly of claim 1, wherein one of the connector housing and the transceiver housing comprises an orientation key and the other comprises an orientation keyway.

4. The optical connector assembly of claim 3, wherein one of the connector housing and the transceiver housing further comprises a latch and the other comprises a cut-out for receiving the latch.

5. A duplex fiber optic connector comprising:
   an integrally-formed housing having a top portion and a bottom portion connected via a flexible hinge and defining a pair of channels for receiving a transmitter fiber optic cable and a receiver fiber optic cable at a first end of the integrally-formed housing;
   a pair of ferrules disposed on a second end of the integrally-formed housing opposite the first end, one ferrule for receiving a first fiber core associated with the transmitter fiber optic cable and the other ferrule for receiving a second fiber core associated with the receiver fiber optic cable;
   a connector latching element disposed on one of the top portion and the bottom portion; and
   a connector orientation key or keyway disposed on the other of the top portion and the bottom portion;
   wherein the top portion and the bottom portion have an upwardly extending protrusion for engaging with upper and lower flexible retaining elements, respectively, of an optical transceiver module and applying a horizontal and vertical retention force to the integrally formed housing.

6. The duplex fiber optic connector of claim 5, wherein the housing comprises an injection-molded plastic material.

7. The duplex fiber optic connector of claim 5, wherein the connector latching element comprises a flexible base element.

8. The duplex fiber optic connector of claim 5, wherein one of the top portion and the bottom portion includes at least one latch element, and the other of the top portion and the bottom portion includes at least one recess for receiving the latch element.

* * * * *